(12) United States Patent
Lerner

(10) Patent No.: US 7,738,373 B2
(45) Date of Patent: Jun. 15, 2010

(54) METHOD AND APPARATUS FOR RAPID LOCATION OF ANOMALIES IN IP TRAFFIC LOGS

(75) Inventor: Michah Lerner, Lakewood, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1041 days.

(21) Appl. No.: 11/083,399

(22) Filed: Mar. 18, 2005

(65) Prior Publication Data
US 2005/0207413 A1 Sep. 22, 2005

Related U.S. Application Data

(60) Provisional application No. 60/554,213, filed on Mar. 18, 2004.

(51) Int. Cl.
H04L 12/26 (2006.01)
(52) U.S. Cl. .......................... 370/232; 370/252; 726/22
(58) Field of Classification Search ................. 370/232, 370/252; 726/22
See application file for complete search history.

(56) References Cited

U.S. PATENT DOCUMENTS

| 7,363,656 | B2* | 4/2008 | Weber et al. ................. 726/23 |
| 2003/0110393 | A1 | 6/2003 | Brock |
| 2004/0250169 | A1 | 12/2004 | Takemori |
| 2005/0039086 | A1* | 2/2005 | Krishnamurthy et al. ...... 714/57 |
| 2005/0138463 | A1* | 6/2005 | Bolt et al. ..................... 714/4 |

OTHER PUBLICATIONS

Krishnamurthy et al., Specification of U.S. Appl. No. 60/495,314, Aug. 14, 2003.*
European Search Report for EP 05102162.4, Nov. 12, 2009, 3 pages.

* cited by examiner

*Primary Examiner*—Jason E Mattis

(57) ABSTRACT

An efficient method and apparatus for rapidly detecting anomalies from massive data streams is disclosed. In one embodiment, the method enables near real time detection of anomaly behavior in networks. The invention rapidly identifies the addresses that require further analysis and reduces the cost of monitoring, the cost of managing the security of the network as well as reduces the time needed to initiate mitigation steps.

3 Claims, 3 Drawing Sheets

METHOD AND APPARATUS FOR RAPID LOCATION OF ANOMALIES IN IP TRAFFIC LOGS

This application claims the benefit of U.S. Provisional Application No. 60/554,213 filed on Mar. 18, 2004, which is herein incorporated by reference.

The present invention relates generally to traffic monitoring and, more particularly, to a method and apparatus for rapid location of anomalies in traffic logs for networks, e.g., packet communication networks such as VoIP networks.

BACKGROUND OF THE INVENTION

The Internet has emerged as a critical communication infrastructure, carrying traffic for a wide range of important scientific, business and consumer applications. Network service providers and enterprise network operators need the ability to detect anomalous events in the network, for network management and monitoring, reliability, security and performance reasons. While some traffic anomalies are relatively benign and tolerable, others can be symptomatic of potentially serious problems such as performance bottlenecks due to flash crowds, network element failures, malicious activities such as denial of service attacks (DoS), and worm propagation. It is therefore very important to be able to detect traffic anomalies accurately and in near real-time, to enable timely initiation of appropriate mitigation steps.

One of the main challenges of detecting anomalies is the mere volume of traffic and measured statistics. This is a particular challenge where the system architecture does not leverage such methods as built-in bottlenecks for failsafe enforcement of policy controls. Given today's traffic volume and link speeds, the input data stream can easily contain millions or more of concurrent flows, so it is often impossible or too expensive to maintain per-flow state. The diversity of network types further compounds the problem. Thus, it is infeasible to keep track of all the traffic components and inspect each packet individually for anomalous behavior. Further risks include the difficulty in discerning whether a usage pattern constitutes the unauthorized access, control or modification of information or system resources. Host-based and network-based logging provides a potential recognition basis as well as the forensic capability to ensure a level of accountability for action or inaction.

Another challenge is that different types of anomalies manifest themselves in a variety of ways and remain in the network for different durations. The anomalies with large durations are identified by detection methods such as top ten counting. The anomalies that are a major challenge to detect are those appearing repeatedly for short durations. Another challenge is the unauthorized tunneling or copying of information, or example by malfeasant information gathering, illicit proxy or store/forward, hijacked management capabilities or outright spyware.

Therefore, a need exists for a method and apparatus for near real-time detection of anomalies in traffic logs that elude simple ranking methods such as "top ten" counting. Anomaly detection is critical for monitoring and maintaining packet networks, e.g., Voice over Internet Protocol (VoIP) networks.

SUMMARY OF THE INVENTION

In one embodiment, the present invention discloses a method and apparatus for rapidly detecting anomalies that elude methods such as top ten counting from massive data streams with a large number of flows. In one embodiment, the method determines the conditions for greater position in the ranking and closer scrutiny. The method then applies the conditions and determines the number of entrances of an entity being observed to the list, number of events while on the list and duration on the list for each observed entity, such as an IP address. Anomalies are detected by comparing with historical data and data collected for other similar entities and profiles. For example, comparisons can be made among IP addresses that share a DNS server.

Thus, the present invention provides an efficient method for computing the highest ranked items in real time and identifying anomalies. The accurate selection of addresses that require further analysis reduces the cost of monitoring, the cost of managing the security of the network as well as reduces the time needed to initiate mitigation steps.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for rapidly detecting anomalies in network traffic logs. Although the present invention is discussed below in the context of detecting traffic anomalies in a network, the present invention is not so limited. Namely, the present invention can be applied in the context of outlier detection in a data stream, flu outbreaks etc. Furthermore, although the present invention is discussed below in the context of packets, the present invention is not so limited. Namely, the present invention can be applied in the context of records, fields, or any other unit or measure of data. For the purpose of scope, the term packet is intended to broadly include a record or a field.

Figure 1:
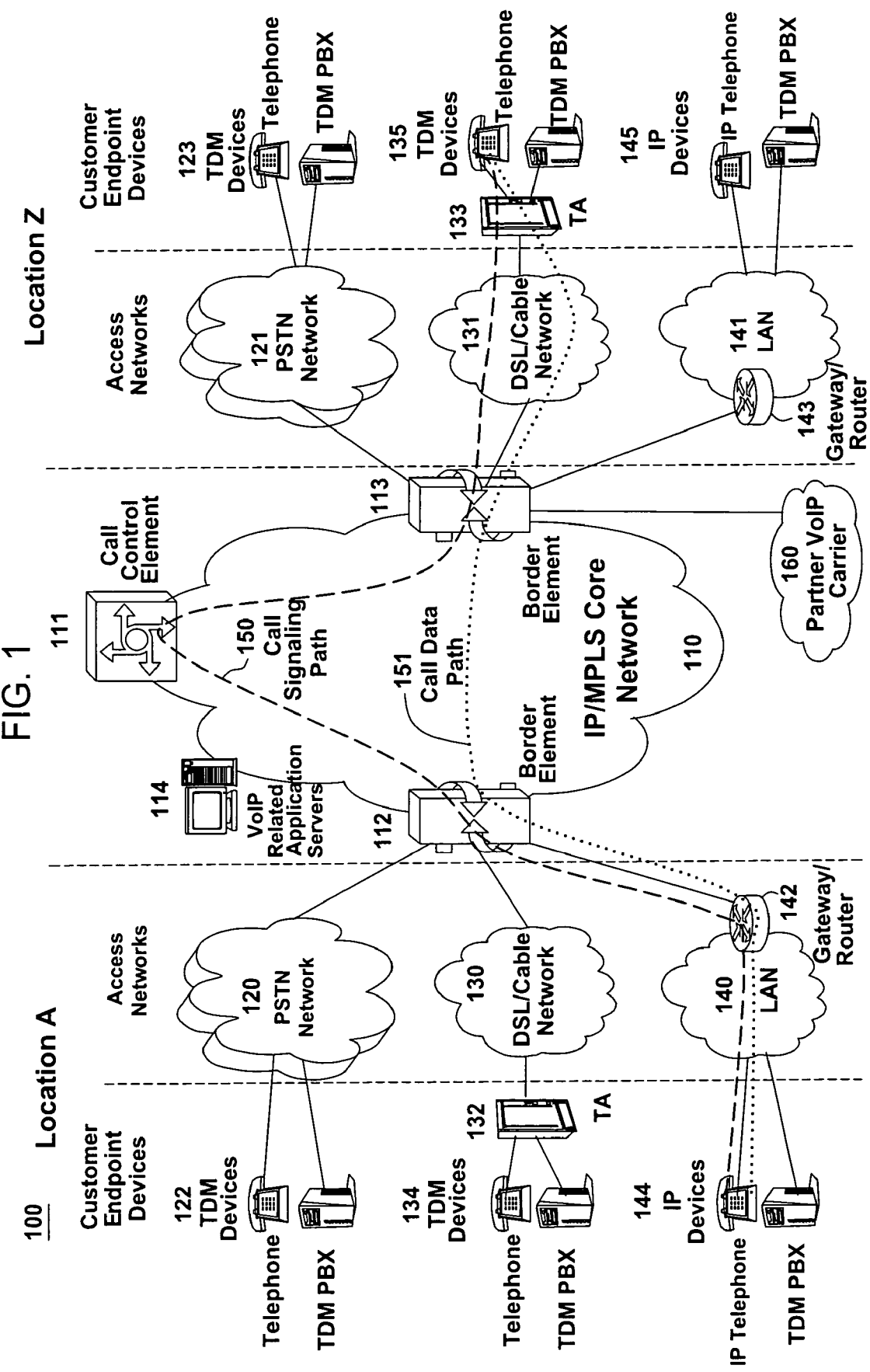
FIG. 1 illustrates an exemplary network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120,121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that requires certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

Note that a customer in location A using any endpoint device type with its associated access network type can communicate with another customer in location Z using any endpoint device type with its associated network type as well. The BEs 112 and 113 are responsible for the necessary signaling protocol translation and media format conversion, such as TDM voice format to and from IP based packet voice format.

The above VoIP network is described to provide an illustrative environment in which a large quantity of packets may traverse throughout the entire network. It would be advantageous to be able to detect anomalies in the network rapidly in order to monitor performance bottleneck, reliability, security, malicious attacks and the like. It is necessary to detect both the short and long duration anomalies events. The present invention provides a method for detecting anomalies that elude methods such as "top ten" counting. In one embodiment, the present method as discussed below can be implemented in an application server of the packet network, e.g., a VoIP network.

In order to clearly illustrate the present invention, the following description assumes a packet network. Without loss of generality, these concepts may be applicable to Uniform Resource Identifiers (URI) and the protocol-specific Uniform Resource Locations (URLs). The URL in particular describes both the packet address as well as the upper-level content-description of the service or resource. The packet network related concepts are that of aggregate descriptions about the resources:

Number of unique addresses (i.e., the degree);
Count of addresses;
Event;
Siblings; and
Cousins.

Number of unique values for a protocol element such as a DNS-name, dialed number, plurality of MPLS labels, destination or a source IP address. The degree is the number of distinct endpoints per event. For example, if a server with an IP address sends a multicast packet to a large list of servers, the degree of addresses refers to the number of IP addresses or servers to which the packet was addressed. The effective degree is the number of IP addresses or servers receiving that same message. The referred degree is the number of indirect recipients, for example due to possibly unauthorized forwarding agents.

Accumulated and recent totals for protocol-defined attributes and values. The count of addresses for an element such as an IP address is the total number of packets (or packet size) per event. For example, if a server sends a 100 kb message to each of ten IP addresses, the exact number of packets depend on configurations and network conditions; the total of packet sizes is 1 Mb. However, if a server updates several other servers, and those servers each send a 100 kb message to ten IP addresses, the indirect yet causal attribution is many megabytes. The unique attribution of delegated traffic is difficult in the absence of explicit traffic tags.

Accumulated totals on delegated traffic occurrences, represented as the values and frequencies of non-routable message digest functions for IP packet elements that pass unaltered through networking infrastructure. These impose equivalence classes on traffic by means of the unique digest value, yet traffic integrity policies are unaffected by inherently opaque digests. Both cryptographic hashes (MD5) and more compact representations are examples of such digest functions. The occurrence of repeated digest values supports unique attribution of delegated traffic.

An event is broadly defined as a trackable or monitored behavior. For example, an event may include but is not limited to, accessing a web site, downloading a software application, downloading an image sequence, contracting a disease, and the like. An observation of an event is the detection of an occurrence of the event. Furthermore, one can define one or more conditions associated with an event (known as policy-defined or condition-defined data), e.g., downloading the same movie four times in one day.

Siblings are IP addresses that share a network property such as domain-name or DNS server and they are referred to as siblings through that domain-name or server.

Cousins are IPn sibling sets that share elements through an ancestor. The number of shared elements in two siblings' reference sets gives a similarity metric. For example, two sibling sets that share the first 6 digits of the IP address are more similar than those that share only the first 3 digits.

In one embodiment, the present method ranks two component elements such as source and destination IP addresses by the cumulative residency within rolling histories. The top ranks are continuously updated according to the degree and count of addresses. The number of distinct endpoints and the total packets for each event determine which IP addresses belong on the list as well as relative positions on the list.

Once the rankings of the different addresses are determined, comparisons are made with the siblings and cousins to identify unusual patterns. The ranking is also compared with historical data or condition-defined data.

As noted above, the Internet is a critical communication infrastructure, carrying traffic for a wide range of important scientific, business and consumer applications. Network service providers and enterprise network operators need the ability to detect anomalous events in the network, for network management and monitoring, reliability, security and performance reasons. While some traffic anomalies are relatively benign and tolerable, others can be symptomatic of potentially serious problems such as performance bottlenecks due to flash crowds, network element failures, malicious activities such as denial of service attacks (DoS), and worm propagation. It is therefore very important to be able to detect traffic anomalies accurately and in near real-time, to enable timely initiation of appropriate mitigation steps.

The major challenges for detection of anomalies are the volume of traffic and the variety of the behavior. The anomalies manifest themselves in a variety of ways and remain in the network for different durations. The anomalies with large durations are identified by detection methods such as top ten counting. The anomalies that are a major challenge to detect are those appearing repeatedly for short durations. The current invention detects such bursty behaviors as suspicious or as activities of interest. Once the list of IP addresses that deserve further analysis (or the candidates) are identified, the traffic is further analyzed for abnormal behavior.

In one embodiment, the present method ranks two component elements such as source and destination IP addresses by the cumulative residency within rolling histories. The ranks are updated according to the degree and count of the addresses. The criteria to be on the list depend on the application. The observations have similar format. Some examples include but are not limited to, entering certain web sites, driving the network load by a predetermined percentage point, high frequency of observation events for a time period etc. The degree and count are maintained for all addresses on a per event basis.

The data is aggregated over multiple historical sizes selected for the application. For example, rolling 30, 60, 600 and 3600 second data history logs are useful for IP traffic. The rankings are both source-to-destination and destination-to-source. Hence, an IP address can be ranked higher for either receiving requests or sending requests. The ranking is maintained on a continual basis. Note that the rank can change up or down with each observation that enters the history or departs after the lifetime expires.

Table 1 illustrates a ranking list for source (SRC) and destination (DST) IP addresses of packets by the cumulative residency within rolling histories.

TABLE 1

| Type | Address (Fictitious IP addresses) | Number (Ranking Position) in Top 10 List | Number of times entered the Top Ten List | Number of Events during residency in Top 10 List | Number of Seconds resident in Top 10 List |
| --- | --- | --- | --- | --- | --- |
| SRC | XY_77_252_226 | 3 | 303 | 161986 | 65895 |
| DST | PQ_20_20_20 | 2 | 2 | 213970 | 86384 |
| DST | RST_255_255_255 | 2 | 2 | 213944 | 86375 |
| DST | XY_77_20_255 | 2 | 1 | 213849 | 86329 |
| DST | XY_77_92_96 | 2 | 2 | 213546 | 86222 |
| DST | XY_77_201_268 | 2 | 5 | 212447 | 85770 |
| SRC | XY_77_20_54 | 2 | 47 | 205016 | 82927 |
| DST | XY_77_20_30 | 2 | 62 | 200660 | 81282 |
| SRC | XY_77_202_82 | 2 | 15 | 187305 | 75479 |
| DST | XY_77_20_0 | 2 | 90 | 184994 | 74701 |
| DST | XY_77_20_7 | 1 | 177 | 147173 | 60793 |
| SRC | XY_77_92_119 | 1 | 330 | 144142 | 58944 |
| SRC | XY_77_92_98 | 1 | 407 | 82102 | 33657 |
| SRC | XY_77_204_222 | 1 | 398 | 45949 | 18501 |
| DST | XY_77_2_0 | 1 | 390 | 9254 | 3864 |
| DST | XY_77_20_115 | 1 | 349 | 5193 | 2155 |
| SRC | XY_77_20_2 | 1 | 275 | 2635 | 1132 |
| DST | XY_277_296_222 | 1 | 189 | 1539 | 732 |

The first column indicates the functional role of whether the element was a destination or a source for the packet. SRC represents source addresses and DST represents destination addresses.

The second column represents an entity or object (not necessarily an identifiable principal) and typically includes the IP addresses. Letters are used in the first part of the addresses to make sure that the addresses do not represent any real IP address. The addresses are fictitious and are shown for the purpose of illustrating the present invention. Generally, the first part of such IP addresses are assigned through a DNS authority and are represented by numbers instead of letters.

The third column provides the ranking position on the list. The highest number of observations is ranked number 1. It is assumed that the addresses are ranked in a rank list having a number of ranked positions, e.g., a list of top 10. However, it should be noted that the list can have any number of rankings including median or percentiles in accordance with the requirement of a particular implementation. Illustratively, the present example has only addresses that are ranked $1^{st}$, $2^{nd}$ or $3^{rd}$ as shown in Table 1.

The fourth column indicates the number of times the particular IP address entered the top ten list. For example, if traffic volume is the behavior being observed, an IP address with changed burst frequencies due to bursty traffic at abnormal intervals would enter and exit the top ten list more often than an IP address with consistently high volume of well-categorized traffic. Hence, column 4 is instrumental in identifying the addresses with bursty patterns. The mere fact that network traffic is bursty does not imply that it is a suspect. The data needs to be compared to historical values (which may be retained through adaptive filters in the network infrastructure) and to comparable data collected for the sibling and cousin IP addresses. For example, a large increase in traffic volume from a financial institution every week-night might simply imply data storage or data synchronization with a remote site. Thus, the IP address for the financial institution might be on the top ten list one time in every 24 hour period. It is considered anomalous upon departure from the acceptable variations from the patterns of occurrence, such as if suddenly it is on the rank list several times in the same time interval.

The fifth column indicates the number of events that are observed while on the top 10 list and the sixth column indicates the length of time in seconds the address is on the top 10 list.

Methods such as "top ten" counting may identify the high-ranking addresses. However, none of those methods attempt to determine the rate at which addresses move in and out of the ranking and their movement within the ranking. The present invention uses the rate of movement within the list and the manner of movement (e.g., in and out) of the rank list to identify anomalies of bursty nature.

In one embodiment, the present method allows observations to expire. This is because stale entries need to be deleted from the list. In addition, if the number of entries to be analyzed is smaller, the analysis and comparison of data can be performed quicker. This allows the network manager to initiate mitigation steps quicker as well as to adjust load for legitimate changes.

Note that the present invention also identifies the anomalies of longer duration. Greater rank is given to an address that frequently has many endpoints compared to an address that has more connections but usually has fewer endpoints. For example, in network security applications it is important to identify viruses and take mitigation steps quickly. If a large node is sending infected emails to large number of customers at a time, the virus will impact computers more quickly compared to infected email sent to few computers at a time even if the action is repeated. The initial impact is greater for the connections with many endpoints. The remedy can be initiated quicker if such connections have greater ranking.

The present method ranks addresses by the cumulative residency within rolling histories in real time. The rank is always being updated according to the parameters such as total packets per event, the number of distinct endpoints per event etc. The data is aggregated over several time intervals of interest for comparison with both historical and sibling data. As opposed to other top ranking methods, the current method detects anomalies quickly and can be applied for streaming data. Anomalies need to be detected as they occur as opposed to minutes later. Mathematically, it is analogous to utilizing the derivative (rate of change) as opposed to tracking the actual value.

For the example in Table 1, it is important to identify or flag the addresses that are moving from the $10^{th}$ place to the $2^{nd}$ place more often, as opposed to the addresses that are moving from the $10^{th}$ place to the $9^{th}$ place. Movements of more than one position are rare in typical IP traffic. Such movement warrants a closer analysis specially if it is repeated often. Furthermore, comparisons with siblings and cousins may reveal if there is a general change of pattern.

If a change of pattern is recognized and found to be legitimate, the servers or network managers can redistribute the load so that the address won't show up on anomaly or interesting data list. An anomaly is broadly defined to be an event of interest, e.g., such as performance bottlenecks due to flash crowds, network element failures, malicious activities such as denial of service attacks (DoS), and worm propagation, and the like. Although the present invention is described in the context of a network, the present invention is not so limited. In other field of uses, an anomaly may be an epidemic, a financial condition, and the like.

Figure 2:
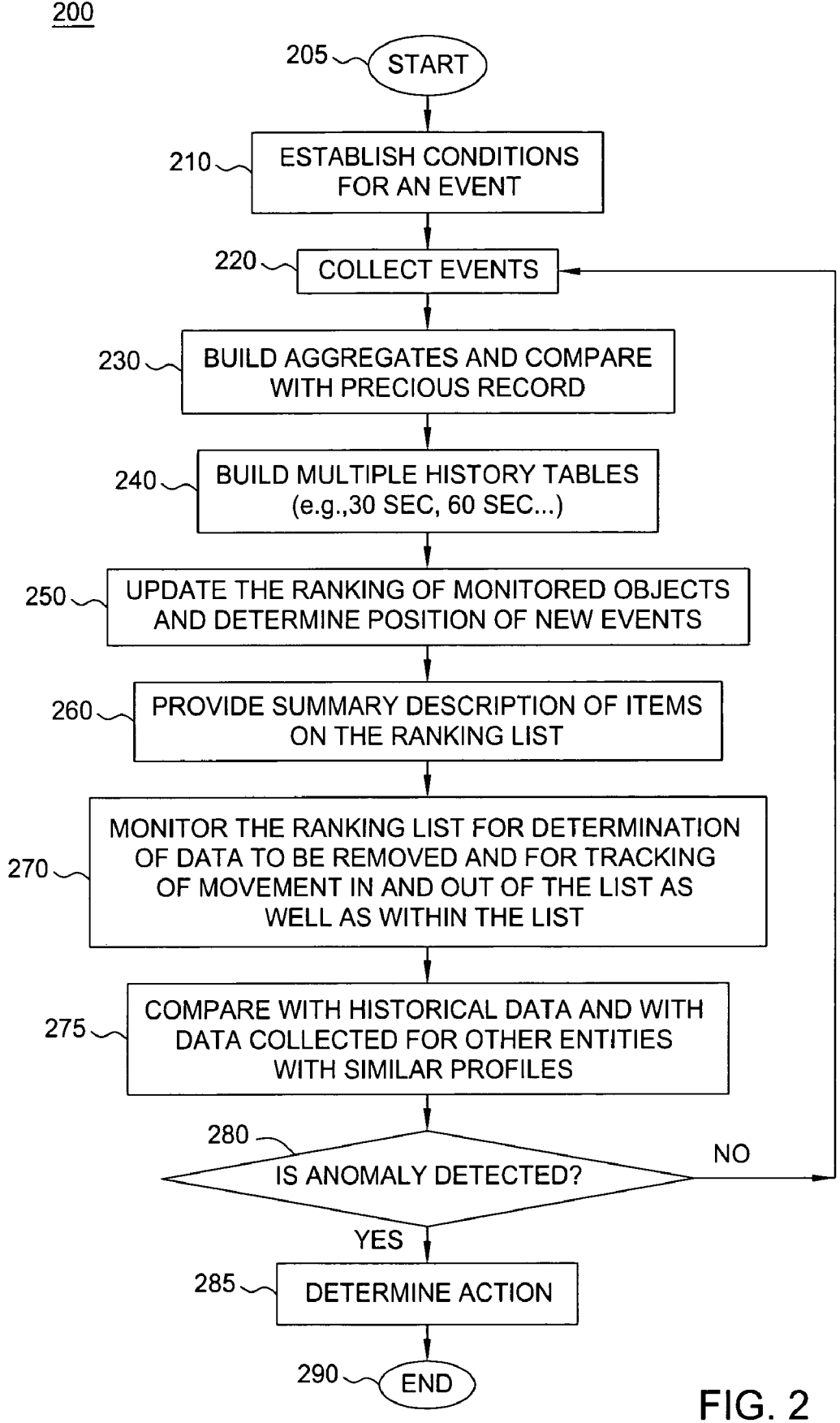
FIG. 2 illustrates a flowchart of a method for rapid location of anomalies in traffic logs.

FIG. 2 illustrates a flowchart of a method 200 for rapid detection of anomalies in network traffic logs of the present invention. Method 200 starts in step 205 and proceeds to step 210.

In step 210, method 200 establishes the conditions for an event. For example, a condition for an event can be driving network load by more than a predetermined percentage point. The frequency and the quantity of the condition to be observed are studied prior to setting the threshold, and may follow a predictive model within a statistically controlled variation. Otherwise, either too many events will be detected or not all the events that should be on the list will be detected. The condition is adjusted when the network behavior changes. For example, releases of new applications such as movies on demand by service providers are expected to increase the volume of large packet transmissions. The relevance of a change may depend on the service architecture, and should balance the service-requirements with potential impact to other services. An increase of 1% after a major movie release may not be relevant unless it is to a high-value resource (login server) with concomitant risk, or it violates network consistency characteristics (contacting IP addresses outside of the name resolution patterns of the DNS server), or the traffic replicates artifacts, which would be unknown to the legitimate customer.

In step 220, method 200 collects the time stamped events. For each event, both the degree and count are collected. For the server example, the number of endpoints and the total number (size) of packets are collected for each event.

In step 230, method 200 builds the aggregates. For example, establishing objects, groups and comparison with previous aggregates are performed in this step. For example, objects can be individual source or destination IP addresses, pairs of source and destination IP addresses, pairs of ports etc. Composite objects are objects that contain a number of related IP addresses. An example is an object containing a DNS server and all its clients. After the objects are established, the groups are determined. In other words, the number of unique endpoints and the size of traffic for each endpoint are determined. Comparisons can be made to determine the differences with the previous aggregates and identify the new aggregates.

In step 240, method 200 builds the multiple historical sizes for each of the objects. For example, history sizes of 30, 60, 600 and 3600 seconds can be maintained for each IP address or pairs of IP addresses identified in step 230.

In step 250, method 200 updates the ranking for the monitored objects and proceeds to step 260.

In step 260, method 200 provides a summary description of the list. The information will be used for subsequent deletions. The deletion occurs when the data is stale (no longer relevant), has not been referred or smaller number of entries are desired for the analysis.

In step 270, method 200 monitors the ranking list. If the data is not relevant, the method shrinks the aggregate description derived in step 230 and updates the ranking. If the data is still relevant or new, it will remain on the list. The monitoring includes movement of the objects within the rank list as well as the entry to and the exit from the rank list. As illustrated in Table 1, the movements of the objects (e.g., in and out) in the list are reported. The movement data is critical for detection of bursty anomalies behavior.

In step 275, method 200 compares the monitored statistics with the profile. Comparisons are made with historical data as well as data collected for siblings and cousins. For example, the profiles of IP addresses that share a DNS server would be similar.

In step 280, method 200 determines whether an anomalies behavior is detected or not. If no anomaly exists, the method proceeds to step 220 to collect more time stamped data. If anomaly is detected, the method proceeds to step 285. Specific examples of anomalies are given above, e.g., the occurrence of repeated digest values supports unique attribution of delegated traffic, whereas the occurrence of these same values on other network segments cannot be attributed to "chance", the traffic replicates artifacts which would be unknown to the legitimate customer, and so on.

In step 285, method 200 determines the appropriate action. For example, if the behavior is legitimate, resources may be reallocated. If the behavior is not legitimate, the anomaly is reported so that mitigation steps (e.g., interrupting an event, e.g., instructing a router to refuse or shunt service from an endpoint device with a particular source IP address, shutting down a server, and the like) can be initiated or the object is reported (e.g., generating a warning flag) so that greater scrutiny is applied to the object.

It is important to note that once the network is able to determine the portion of the data deserving of further analysis, the network is better equipped to more accurately and efficiently detect anomalous events. Method 200 may proceed to perform other post analysis functions such as reporting to customers, billing etc. Method 200 ends in step 290.

It should be noted that the steps of method 200 of FIG. 2 need not be performed for each event or is required to be performed in the order as shown. In fact, some of the steps can be treated as optional depending on the requirements of a particular implementation.

Figure 3:
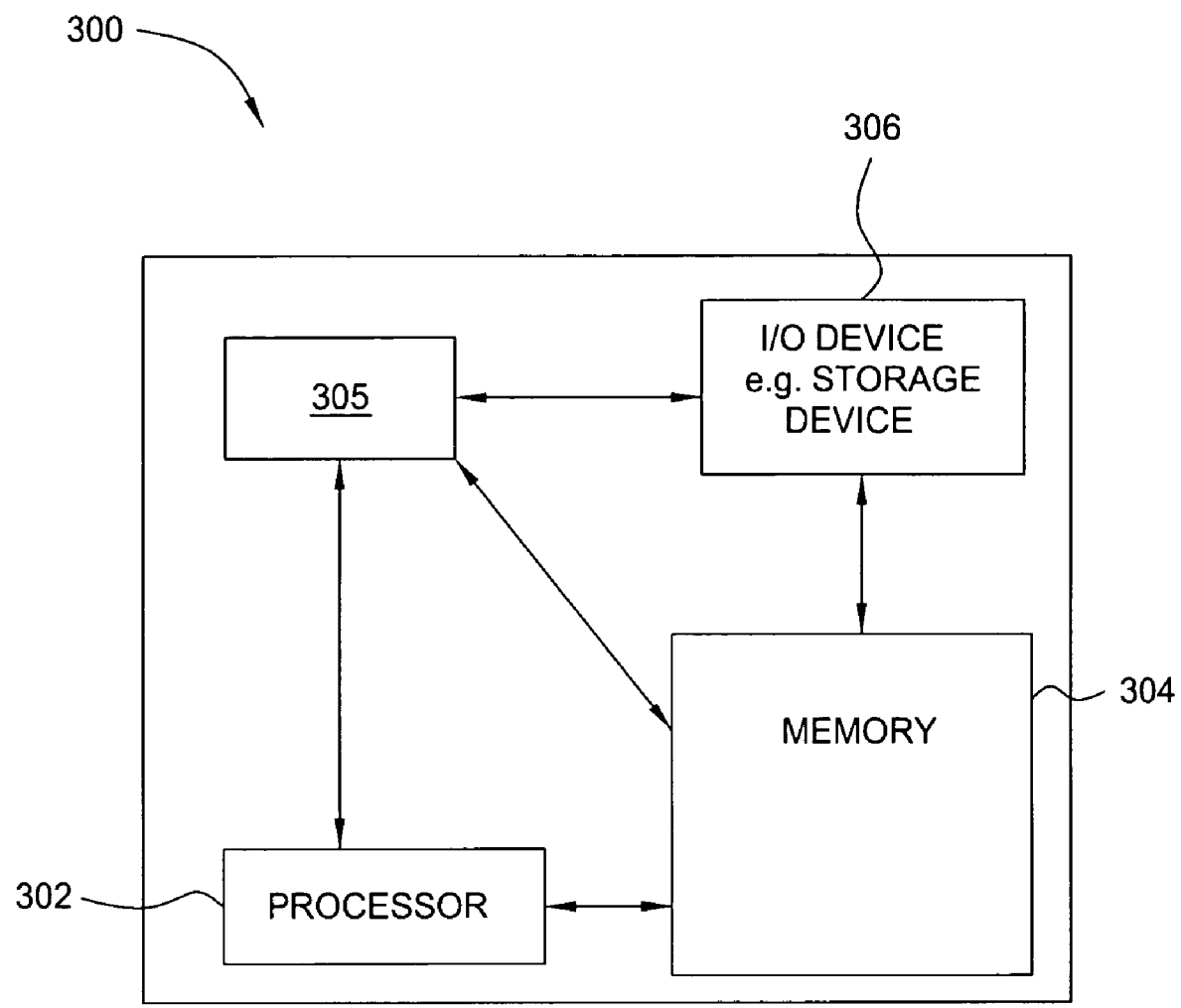
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), an anomaly detection module 305, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present anomaly detection module or process 305 can be loaded into memory 304 and executed by processor 302 to implement the functions as discussed above. As such, the present anomaly detection method 305 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for identifying an anomaly, comprising:
   receiving at least one unit of data, where said at least one unit of data is associated with an event;
   monitoring at least one object associated with said event;
   ranking said at least one object with a ranking on a rank list;
   identifying, via a processor, an anomaly in accordance with a movement of said at least one object within said rank list, wherein said movement comprises at least one of: a rate of entry of said at least one object to said rank list, a rate of exit of said at least one object from said rank list, or a rate of movement of said at least one object between rankings of said rank list; and
   comparing said ranking of said at least one object to data collected for siblings or cousins.

2. A computer-readable medium having stored thereon a plurality of instructions, the plurality of instructions including instructions which, when executed by a processor, cause the processor to perform steps of a method for identifying an anomaly, comprising:
   receiving at least one unit of data, where said at least one unit of data is associated with an event;
   monitoring at least one object associated with said event;
   ranking said at least one object with a ranking on a rank list;
   identifying an anomaly in accordance with a movement of said at least one object within said rank list, wherein said movement comprises at least one of: a rate of entry of said at least one object to said rank list, a rate of exit of said at least one object from said rank list, or a rate of movement of said at least one object between rankings of said rank list; and
   comparing said ranking of said at least one object to data collected for siblings or cousins.

3. An apparatus for identifying an anomaly, comprising:
   means for receiving at least one unit of data, where said at least one unit of data is associated with an event;
   means for monitoring at least one object associated with said event;
   means for ranking said at least one object with a ranking on a rank list;
   means for identifying an anomaly in accordance with a movement of said at least one object within said rank list, wherein said movement comprises at least one of: a rate of entry of said at least one object to said rank list, a rate of exit of said at least one object from said rank list, or a rate of movement of said at least one object between rankings of said rank list; and
   means for comparing said ranking of said at least one object to data collected for siblings or cousins.

* * * * *